US011750858B2

(12) United States Patent
Sallas et al.

(10) Patent No.: US 11,750,858 B2
(45) Date of Patent: Sep. 5, 2023

(54) DIGITAL TRANSPORT ADAPTER

(71) Applicant: TIVO CORPORATION, San Jose, CA (US)

(72) Inventors: Michael Sallas, Radnor, PA (US); David DeAndrade, San Anselmo, CA (US); Christopher Stone, Newtown, PA (US)

(73) Assignee: TIVO CORPORATION, San Jose, CA (US)

( * ) Notice: Subject to any disclaimer, the term of this patent is extended or adjusted under 35 U.S.C. 154(b) by 0 days.

(21) Appl. No.: 17/137,764

(22) Filed: Dec. 30, 2020

(65) Prior Publication Data

US 2021/0120280 A1   Apr. 22, 2021

Related U.S. Application Data

(63) Continuation of application No. 16/923,533, filed on Jul. 8, 2020, now Pat. No. 11,297,361, which is a
(Continued)

(51) Int. Cl.
H04N 21/2385 (2011.01)
H04N 21/2668 (2011.01)
H04N 21/858 (2011.01)
G06F 16/84 (2019.01)
H04N 21/239 (2011.01)
(Continued)

(52) U.S. Cl.
CPC ......... *H04N 21/2385* (2013.01); *G06F 16/84* (2019.01); *H04N 21/2393* (2013.01); *H04N 21/2668* (2013.01); *H04N 21/42615* (2013.01); *H04N 21/4341* (2013.01); *H04N 21/4345* (2013.01); *H04N 21/4384* (2013.01); *H04N 21/43853* (2013.01); *H04N 21/8456* (2013.01); *H04N 21/858* (2013.01); *G06F 16/748* (2019.01); *H04N 21/234* (2013.01)

(58) Field of Classification Search
CPC .................................................. H04N 21/2385
See application file for complete search history.

(56) References Cited

U.S. PATENT DOCUMENTS 7,953,160 B2    5/2011   Gordon et al.
2003/0101448 A1  5/2003   Kim
(Continued)

OTHER PUBLICATIONS

DLNA Client Implementation Guide, Comcast-SP-DLNA-CIG-101-130314, Mar. 14, 2013, 31 pages.
(Continued)

Primary Examiner — Michael H Hong
(74) Attorney, Agent, or Firm — HALEY GUILIANO LLP

(57) ABSTRACT

One or more computing devices may be configured to identify information corresponding to a program change request associated with a multi-program data transmission. The information may comprise at least a link to a desired program within the multi-program data transmission. The one or more computing devices may communicate the link to the desired program to a client device over a specified time period. After the time period, the one or more computing devices may communicate the desired program to the client device using a single program data transmission. The single program data transmission may be derived from the multi-program data transmission.

20 Claims, 9 Drawing Sheets

Related U.S. Application Data continuation of application No. 16/146,498, filed on Sep. 28, 2018, now Pat. No. 10,757,455, which is a continuation of application No. 15/347,218, filed on Nov. 9, 2016, now Pat. No. 10,148,985, which is a continuation of application No. 14/284,978, filed on May 22, 2014, now Pat. No. 9,521,442.

(51) Int. Cl.
| | | |
|---|---|---|
| *H04N 21/426* | (2011.01) | |
| *H04N 21/434* | (2011.01) | |
| *H04N 21/438* | (2011.01) | |
| *H04N 21/4385* | (2011.01) | |
| *H04N 21/845* | (2011.01) | |
| *G06F 16/74* | (2019.01) | |
| *H04N 21/234* | (2011.01) | |

(56) References Cited

U.S. PATENT DOCUMENTS

| | | | | |
|---|---|---|---|---|
| 2005/0101246 | A1* | 5/2005 | Choi | H04N 21/472 |
| | | | | 348/E7.071 |
| 2009/0128713 | A1* | 5/2009 | Kwon | H04N 5/50 |
| | | | | 348/731 |
| 2010/0189122 | A1* | 7/2010 | Dandekar | H04L 65/762 |
| | | | | 370/412 |
| 2011/0107379 | A1 | 5/2011 | Lajoie et al. | |
| 2011/0231870 | A1* | 9/2011 | Hartung | H04L 65/70 |
| | | | | 725/116 |
| 2012/0288091 | A1* | 11/2012 | Honke | H04N 5/913 |
| | | | | 380/210 |

OTHER PUBLICATIONS

Home Digital Network Interface Specification with Copy Protection, Society of Cable Telecommunications Engineers, ANSI/SCTE 26 2010, 33 pages.

MPEG-2: The basics of how it works, <http://www.keysight.com/upload/cmc_upload/AII/6C06MPEGTUTORIAL1.pdf?Sicc=US&lc=eng>, retrieved Nov. 11, 2013, 17 pages.

Digital Transmission Content Protection Specification, vol. 1, Digital Transmission Licensing Administrator, Dec. 14, 2011, 84 pages.

Urban, Leon. MPEG 101—Transport Stream Demystification, Triveni Digital, Inc., Aug. 17, 2011, 105 pages.

Technologies and Services on Digital Broadcasting, Overview of MPEG-2 Systems, Broadcast Technology No. 11, Summer 2002, pp. 16-23.

* cited by examiner

DIGITAL TRANSPORT ADAPTER

CROSS REFERENCE TO RELATED APPLICATIONS

This application is a continuation of U.S. patent application Ser. No. 16/923,533, filed on Jul. 8, 2020, which is a continuation of U.S. patent application Ser. No. 16/146,498 (now U.S. Pat. No. 10,757,455), filed Sep. 28, 2018, which is a continuation of U.S. patent application Ser. No. 15/347,218 (now U.S. Pat. No. 10,148,985), filed Nov. 9, 2016, which is a continuation of U.S. patent application Ser. No. 14/284,978 (now U.S. Pat. No. 9,521,442), filed May 22, 2014. The disclosures of each application are hereby incorporated by reference herein in their entireties.

BACKGROUND

Many users today subscribe to video services and subscription entitles them to view programming offered by various content sources such as ESPN, HBO, etc. These subscription programming services are often communicated to the users via one or more wired and/or wireless networks. In some cases, other programming options may be available using networks that do not require a subscription, such as programming communicated in a non-protected format e.g., clear Quadrature Amplitude Modulation (clearQAM) format. Sometimes, such as when non-subscription content is encrypted, a gateway device or program (e.g., a set-top box, a digital transport adapter (DTA), etc.) may be useful to allow a non-subscriber to access these programming options. However, such devices may be expensive to purchase and/or manufacture and may, therefore, only be offered to those who subscribe to video service offerings. As such, there remains a need to provide users access to certain programming options, such as local television channels and other content, without requiring a subscription and/or without using expensive equipment.

SUMMARY

In some embodiments herein, a computing device, such as a gateway (e.g., a set top box, a DTA, a digital media server (DMS), etc.), may be configured to identify information corresponding to a content change request associated with a multi-content data transmission, such as a multi-program data stream. The information may comprise at least a link to desired content (e.g., a video program) within the multi-content (e.g., multi-program) data stream that was received via a network. The computing device may communicate the link to the desired program/content to a client device over a specified duration of time (e.g., a specified time period). After the time period, the computing device may communicate the desired program and/or other desired content to the client device using a single program data transmission, such as a single program data stream. The single program data stream corresponding to the desired program may be derived from the multi-program transport stream and may provide access to the program using the link. In response to a received channel change request, for example, the DTA may identify a program association table (PAT), or another data association file, within the multi-program transport stream. For example, the PAT may include a link to a program mapping table (PMT), or include the PMT data, associated with the desired programming content. For example, the PMT may include a link to a video portion of the desired program and another link to an audio portion of the program. In some cases, the PMT may include a link to other content, such as closed-captioning content and/or a channel guide. To ensure that the single program data stream is compliant to at least one communication standard (e.g., digital transmission content protection (DTCP), etc.), the computing device may then generate a modified PAT and/or a modified PMT by including a DTCP descriptor within the modified PAT and/or the modified PMT.

In some embodiments, the computing device (e.g., a gateway or set top box) may be configured to filter, or otherwise use, at least a portion of the multi-program data stream (e.g., a multi-program transport stream (MPTS)) to produce a transmission (e.g., a single program transport stream (SPTS)) associated with the desired program and may be compliant with one or more communications standards. In some embodiments, the SPTS may be formed by removing programming content and/or references to programming content different than the program indicated by the program change request. For example, in some embodiments, references to different programs may be removed from the PAT or similar data file. In some embodiments, data streams that correspond to aspects of different programs (e.g., an audio portion and/or a video portion) may be filtered, or otherwise removed from the SPTS. In some cases, the single program data stream may be substantially similar to the multi-program transport stream, where one of the program mapping table and/or the program association table may be individually substituted with modified versions of the respective tables. For example, a first version of a table (e.g., a program association table, a program mapping table, etc.) may be received as part of the multi-program transport stream. In some cases, a second version of the table, for use in the single program data stream, may be created by modifying (e.g., filtering) the first version of the table to remove references to programming content other than the program indicated by the program change request. For example, the computing device may first substitute a modified PAT in the SPTS over a specified time period (e.g., about 100 milliseconds, about 500 milliseconds, etc.). In some cases, the modified PAT may include a version number that is the same as a version number associated with the original PAT. In other cases, the modified PAT may include a version number increased from the version number of the original PAT and/or a PAT previously delivered to a requesting device, such as in an SPTS. After the time period, the DTA may then revert back to the original PAT and then substitute a modified PMT in the SPTS, which is then communicated to the client device. In some cases, the version number associated with the modified PMT may be set to a number equal to, or greater than, the version number of the original PMT and/or a previously delivered PMT.

In some embodiments, the computing device may receive a program change request from a user. This program change request may be specified at a user device (e.g., a set top box or television) and/or via a client on another device. Once received, the computing device may identify information associated with the program change request within a received transmission (e.g., a multi-program transport stream), such as a program association table including a link to an associated program mapping table and/or the program mapping table corresponding to the requested program. The computing device may be configured to communicate the program association table to the client device for a specified time period. In some cases, a communication channel (e.g., an HTTP socket) may be or have been active between the computing device and the client device. The computing device may be configured to communicate a transmission that may include minimal or no data (e.g., a null data stream) to the client device to ensure that the communication channel remains active, such as during the processing time of the program change request. In such cases, the computing device may communicate the program association table to the client device via the null data stream. For example, a DTA may include a modified PAT, as discussed above, within the null data stream for a specified time period. After the time period, the DTA may then communicate a transmission associated with a single program (e.g., a single program transport stream) to the client device, where the SPTS includes at least a modified PMT and one or more elementary streams including audio and/or video content of the requested program.

In some embodiments, an apparatus may include a processor and a memory communicatively coupled to the processor. In some cases, the apparatus may further include a communication interface that may be communicatively coupled to the processor. The communication interface may include at least a first port configured to receive a data transmission (e.g., an MPTS) from a service provider via a first network. The communication interface may also include a second port configured to communicate a single program transmission (e.g., a single program data stream) to a client device, such as via a user network (e.g., a local area network, a directly wired connection, etc.). The memory may be configured to store instructions that, when executed by the processor, cause the apparatus to perform aspects of the techniques discussed above.

For example, the apparatus may be caused to receive a request to deliver a desired program to a client device, communicate a program association table identifying a location of a desired program within a data stream to the client device over a specified time period. In some cases, the apparatus may be configured to communicate a null data stream to the client device. In such cases, the apparatus may insert the program association table into the null data stream. In other cases, the apparatus may be configured to substitute a modified (e.g., a DTCP compliant) program association table into a single program data stream based on the multi-program transport stream. After the specified time period, the apparatus may be caused to communicate, to the client device, a single program data stream including the desired program, wherein the desired program content is located at position(s) within the single program data stream as indicated by the program association table.

In some embodiments, the memory may further store instructions, that when executed, may cause the apparatus to receive a multi-program transport stream via a network associated with a service provider (e.g., Comcast), identify a program mapping table associated with the desired program within the multi-program transport stream, and create the single program data stream based, at least in part, on a portion of the multi-program transport stream. In some cases, the apparatus may create the single program data stream based on information included in the program association table and/or the program mapping table of the multi-program transport stream. The apparatus may modify the program association table, such as by including a DTCP descriptor, to ensure that a single program data stream including the modified PAT would be compliant to a specification (e.g., DTCP). The modified PAT may be substituted into the single program data stream for a specified time period. After the specified time period, the original PAT may be communicated, along with a PMT modified with the DTCP descriptor, within the single program data stream to provide the requested program for presentation to a user.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
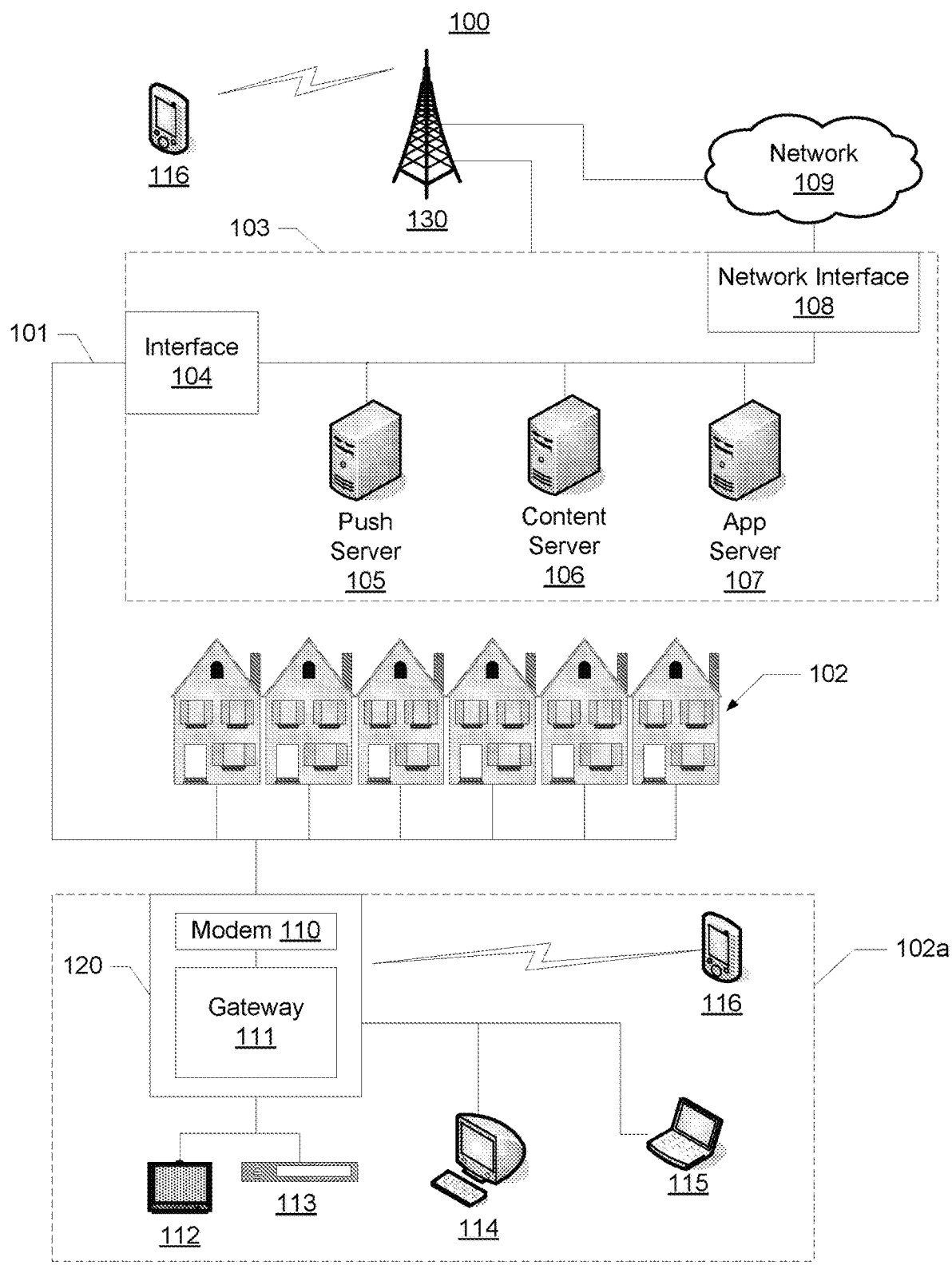
FIG. 1 illustrates an illustrative network environment.

FIG. 1 illustrates an example of an information distribution network 100 in which many of the various features described herein may be implemented. The illustrated information distribution network is only one example of a suitable network and is not intended to suggest any limitation as to the scope of use or functionality of the disclosure. The illustrated network should not be interpreted as having any dependency or requirement relating to any component or combination of components in an information distribution.

The network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other suitable type of information distribution network or combination of networks. For example, the network 100 may be a cellular broadband network communicating with multiple communications access points, such as a wireless communications tower 130. In another example, the network 100 may be a coaxial system comprising a cable modem termination system (CMTS) communicating with numerous gateway interface devices (e.g., gateway interface device 111 in example home an illustrative home 102a). In another example, the network 100 may be a fiber-optic service system comprising optical fibers extending from an optical line terminal (OLT) to numerous optical network terminals (ONTs) communicatively coupled with various gateway interface devices. In another example, the network 100 may be a digital subscriber line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other suitable network architectures now known or later developed.

The network 100 may use a series of interconnected communication links 101 (e.g., coaxial cables, optical fibers, wireless links, etc.) to connect a premises 102 (such as homes) or other user environments to the local office 103. The communication links 101 may include any suitable wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other suitable components for communicating data. Data may include, for example, internet data, voice data, weather data, content data, and any other suitable information. Content data may include, for example, video content, audio content, media on demand, video on demand, streaming video, television programs, text listings, graphics, advertisements, and other content. A content item may represent an individual piece of content, such as a media content item (e.g., a particular movie, television episode, online video clip, song, audio recording, image, or other media content) or any other data. In some instances, a content item may be fragmented into segments, such as a plurality of two-second video fragments that may be separately addressed and retrieved.

The local office 103 may transmit downstream information signals onto the communication links 101, and the premises 102 may receive and process those signals. In certain implementations, the communication links 101 may originate from the local office 103 as a single communications path, and may be split into any suitable number of communication links to distribute data to the premises 102 and various other destinations. Although the term home is used by way of example, the premises 102 may include any type of user environment, such as single family homes, apartment complexes, businesses, schools, hospitals, parks, and other suitable environments and combinations of environments.

The local office 103 may include an interface 104, which may be a computing device configured to manage communications between devices on the network of the communication links 101 and backend devices, such as one or more servers, such as a push server 105, a content server 106, and an application server 107. For example, the interface 104 may be a cable modem termination system (CMTS). The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The one or more external networks 109 may include, for example, one or more telecommunications networks, Internet Protocol networks, cellular communications networks (e.g., Global System for Mobile Communications (GSM), Code Division Multiple Access (CDMA), and any other suitable 2nd, 3rd, 4th and higher generation cellular communications networks), cellular broadband networks, radio access networks, fiber-optic networks, local wireless networks (e.g., Wi-Fi, WiMAX), satellite networks, and any other suitable networks or combinations of networks.

The local office 103 may include a variety of servers that may be configured to perform various functions. The local office 103 may include one or more servers (e.g., the push server 105) for generating push notifications to deliver data, instructions, or both to devices that are configured to detect such notifications. For example, the push server 105 may transmit an instruction to a device to transfer service from one wireless network or communications access point to another wireless network or communications access point. Further, the local office 103 may include one or more content servers 106 configured to provide content (e.g., media content) to devices. The local office 103 may also include one or more application servers 107. For example, the application server 107 may be used to implement a caching device, such as a cache server, for the content stored in or provided by the content server 106.

The premises 102 may comprise a single family home, an apartment, an outdoor restaurant, an office suite, or any other suitable indoor environment and extend to an outdoor environment. The illustrative home 102a may include an interface 120, which may include one or more devices, such as a modem 110, for communicating on the communication links 101 with the local office 103, one or more external networks 109, or both. For example, the modem 110 may be a coaxial cable modem (for use with one or more coaxial cable links 101), a broadband modem (for use with one or more DSL links 101), a fiber interface node (for use with one or more fiber-optic links 101), or any other suitable device or combination of devices. In certain implementations, the modem 110 may be a part of, or communicatively coupled to, a gateway device, such as a gateway interface device 111. The gateway interface device 111 may be, for example, a wireless router, a set-top box, a computer server, or any other suitable computing device or combination.

The gateway interface device 111 may be any suitable computing device for communicating with the modem 110 to allow one or more other devices in the illustrative home 102a to communicate with the local office 103, the one or more external networks 109, or other devices communicatively coupled thereto. The gateway interface device 111 may include one or more local network interfaces to provide communication signals to user devices in or near the illustrative home 102a, such as a television 112, a set-top box 113, a personal computer 114, a laptop computer 115, a wireless device 116 (e.g., a wireless laptop, a tablet computer, a mobile phone, a portable gaming device), a vehicular computing system 117 (e.g., a mobile computing system, navigation system, or entertainment system in an automobile, marine vessel, or aircraft) and any other suitable device.

Figure 2:
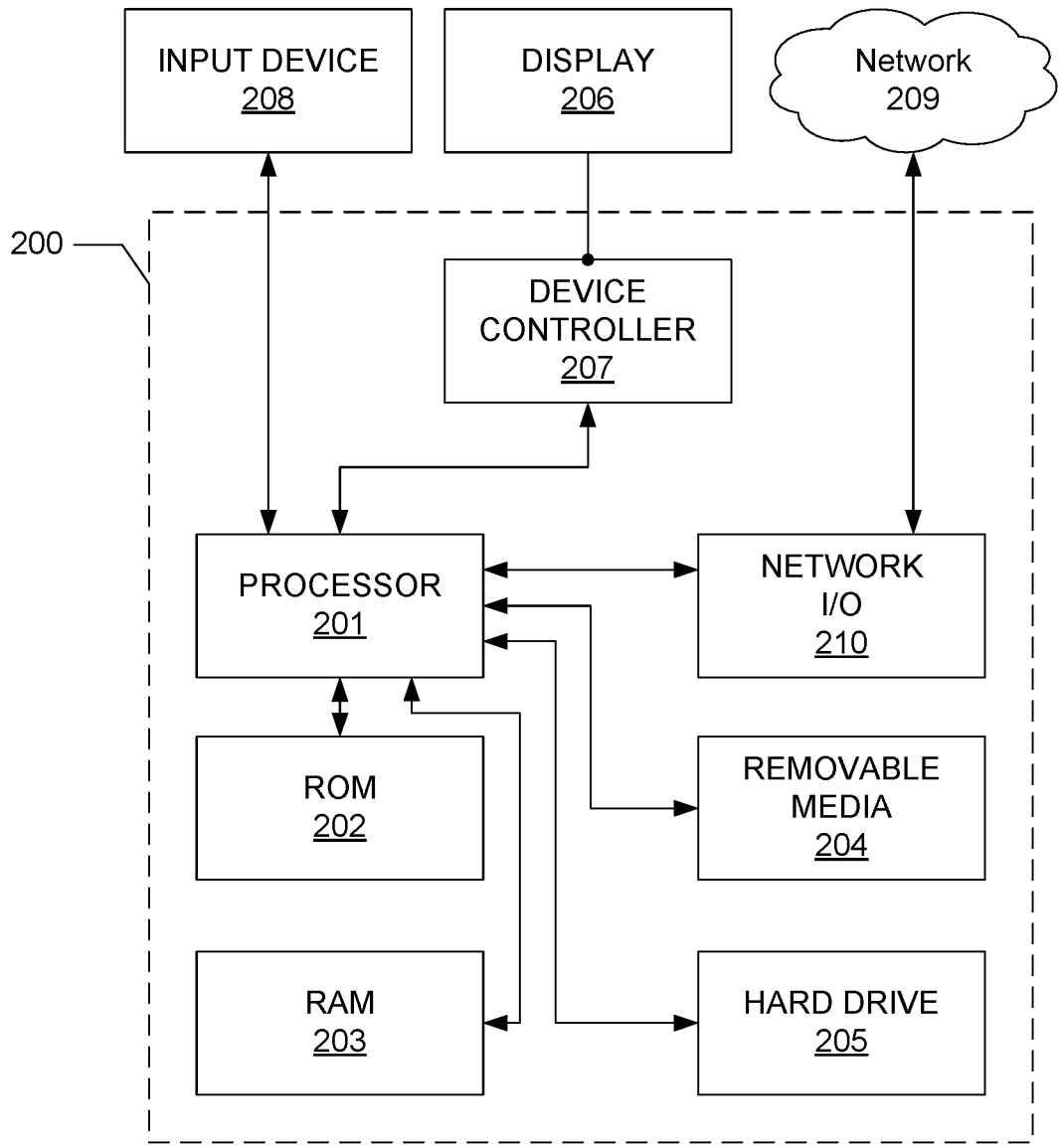
FIG. 2 shows an illustrative computing device on which various elements described herein can be implemented.

FIG. 2 illustrates general hardware elements and software elements that can be used to implement any of the various computing devices and/or software discussed herein. A device 200 may include one or more processors 201, which may execute instructions of a computer program to perform any of the functions and steps described herein. The instructions may be stored in any type of computer-readable medium or memory to configure the operation of the one or more processors 201. For example, instructions may be stored in a read-only memory (ROM) 202, a random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in a hard drive 205, which may be an internal or external hard drive.

The device 200 may include one or more output devices, such as a display 206, such as an external monitor or television, and may include one or more output device controllers 207, such as a video processor. In some embodiments, the device 200 may include one or more user input devices 208, such as a remote control, keyboard, mouse, touch screen, microphone, or any other suitable input device.

The device 200 may also include one or more network interfaces, such as a network input/output (I/O) interface 210 to communicate with an external network 209. The network I/O interface 210 may be a wired interface, wireless interface, or a combination of the two. In some embodiments, the network I/O interface 210 may include a cable modem, and the external network 209 may include the communication links 101 shown in FIG. 1, one or more external networks 109, an in-home network, a provider's wireless, coaxial, fiber, or hybrid fiber/coaxial distribution system (e.g., a DOCSIS network), or any other desired network.

Figure 3:
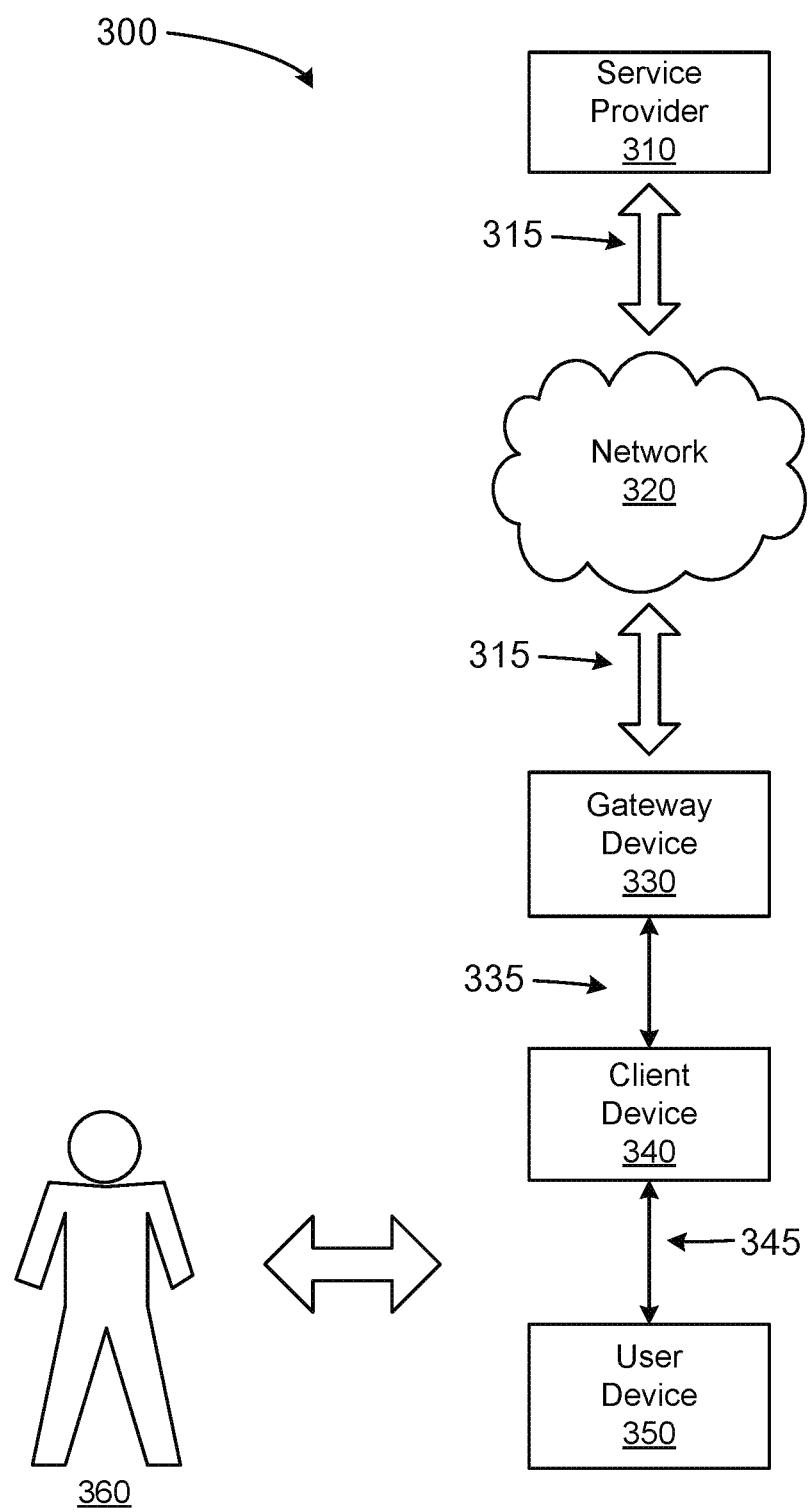
FIG. 3 shows an illustrative content delivery system.

FIG. 3 illustrates an illustrative content delivery system 300 on which features described herein may be used. The content delivery system 300 may include a service provider 310 that may provide programming content via a network 320, such as the one or more external networks 109. A gateway device 330 may be configured to receive a transmission and/or other signal, such as a multi-program transport stream 315, from the service provider 310 via a network (e.g., the one or more external networks 109). The gateway device 330 may convert the multi-program transport stream 315 to a single program transmission, such as a single program transport stream 335, and communicate the SPTS 335 to a client device 340. The client device 340 may then decode the program from the SPTS 335 and provide the program 345 to a user device 350 for presentation to a user 360.

The service provider 310 may be, for example, a subscription service that allows users to view content from various content sources. For example, the service provider 310 may be a cable television service provider, which may allow users to tune to and view content from various content sources, such as video programming from HBO, ESPN, Showtime, etc. Service provider 310 may offer services on different media associated with the network 320, such as via coaxial cable, fiber optic cable, wireless cellular signal, satellite, or any other desired media for transmitting content signals, and the content may be received by the gateway device 330, such as the set-top box 113 or a digital transport adapter (DTA) as described below.

In some cases, the service provider 310, via the network 320, may provide programming to a user, where the programming may be categorized in two or more tiers. For example, a first tier of programming may include encrypted content that may be offered solely to subscribers and a second tier may include programming that may include basic programming options, such as local television channels, community programming, and the like. For example, when a user 360 purchases subscription services from the service provider 310, the service provider may provide (e.g., lease, sell, give, etc.) a set-top box 113 for use as the gateway device 330. The set-top box 113 may be configured to decrypt the content associated with the subscribed services, such as different tiers of cable television programming, premium channels, on-demand programming, and the like. In some cases, the set-top box may also include a digital video recorder (DVR) that may be capable of recording one or more programs simultaneously. Further, the set-top box 113 may include one or more memory devices (e.g., a random access memory, a flash memory, an optical storage device, a magnetic media device, and/or the like) capable of storing large amounts of programming content. To provide these services, the set-top box 113 may be supplied in a large form factor and may require large amounts of programming resources.

For example, the service provider 310 may provide programming content encoded in a transport stream, such as a Motion Pictures Expert Group (MPEG) compliant transmission, such as a multi-program transport stream 315. The multi-program transport stream 315 may include two or more different programs within the same data stream. The programming content for a particular program may further be communicated as one or more elementary streams within the MPTS 315. For example, a program may be communicated as an audio elementary stream and a video elementary stream. In some cases, the MPTS 315 may further include other streams that may provide, for example, emergency services, program channel guides, and the like. The MPTS 315 may include one or more tables that may be used to identify which portions of the MPTS are associated with a particular program. For example, the MPTS 315 may include a program mapping table (PMT) for each of the different programs included in the MPTS 315. The PMT may include a link identifying where a device may access each of the elementary streams (e.g., audio, video, etc.) associated with the program within the MPTS 315. Further, the MPTS 315 may include a program association table (PAT) that may include a listing of each PMT, and a location within the MPTS 315, for each program included in the MPTS 315.

In some cases, the second tier programming may be available at no, or little, cost to the user 360. Traditionally, the second tier programming may not have been encrypted, so that any user device 350 configured with a compatible tuner would allow a user to view the programming. For example, a television set may include a Quadrature Amplitude Modulation (QAM) tuner that a consumer could connect directly to the external network 209 and view the program. In other cases, the client device 340, that may be provided by a third-party service provider (e.g., Boxee, Roku, Apple Inc., etc.), may be used to decode and/or provide the programming to a television, such as the user device 350. Sometimes, however, the secondary content may be encoded. As such, the gateway device 330 may provide programming in a format (e.g., the SPTS 335) that may be usable by the client device 340.

For example, the gateway device 330 may receive the transmission (e.g., the MPTS 315) via the one or more external networks 109. The gateway device 330 may be configured to decode content, such as in response to a request (e.g., a channel change request) from the user 360. The set-top box 113, as necessitated by the above mentioned features, may be powerful enough to process the MPTS 315 in near real-time to provide a transmission for communicating a single program (e.g., the SPTS 335) tailored for the specific program requested by the user 360. For example, the set-top box 113 may include a sufficiently powerful processor and enough memory to process the MPTS 315 in real-time and generate a complete SPTS 335 for each requested program. In doing so, the set-top box 113 may assemble a new SPTS 335 using information taken from the MPTS. For example, the set-top box 113 may copy the PAT, the PMT associated with the requested program, and the elementary audio and/or video streams into the memory. The set-top box 113 may then assemble a new SPTS 335 using this information and including generating a new PMT identifying the new location of the elementary streams within the SPTS 335 and a new PAT identifying the location of the PMT within the SPTS 335.

Because the set-top box 113 includes a powerful processor, it is capable of generating the new SPTS 335 with minimal latency. However, providing set-top boxes to provide this service may not be practical. For example, because features necessarily performed by the set-top box require large amounts of processing power and/or large amounts of available memory, using the set-top box 113 to perform this decoding of the second tier programming would be cost prohibitive. As such, a need was recognized for a cost effective solution for providing access to this second tier content. Further, because processing power and/or energy consumption may correspond with the costs of the associated chipsets, a further need was recognized to minimize latency associated with a response to a program change request, while minimizing energy use. For example, if a less powerful gateway device 330 would be used to perform the same process of generating a new SPTS 335, the latency between receiving the request for a new program and providing the new content may be many times (e.g., about 5 times, about 10 times, etc.) that of the set-top box 113. For example, latencies of about 5 seconds to about 10 seconds may be seen between receiving a content change request and providing the requested content. Additionally, consumers increasingly desire to reduce energy costs associated with the use of their electronic equipment. As such, the consumers look to purchase electronic components capable of meeting various energy consumption requirements, such as the Energy Star program. Often, however, chipsets that are sufficiently powerful to minimize latencies, while minimizing energy use, are often those having the highest associated cost. As such, it is desirable to provide an apparatus, such as the gateway device 400 of FIG. 4, capable of performing a cost-effective method of providing a requested program after a program change request, while minimizing latencies and/or energy use.

Figure 4:
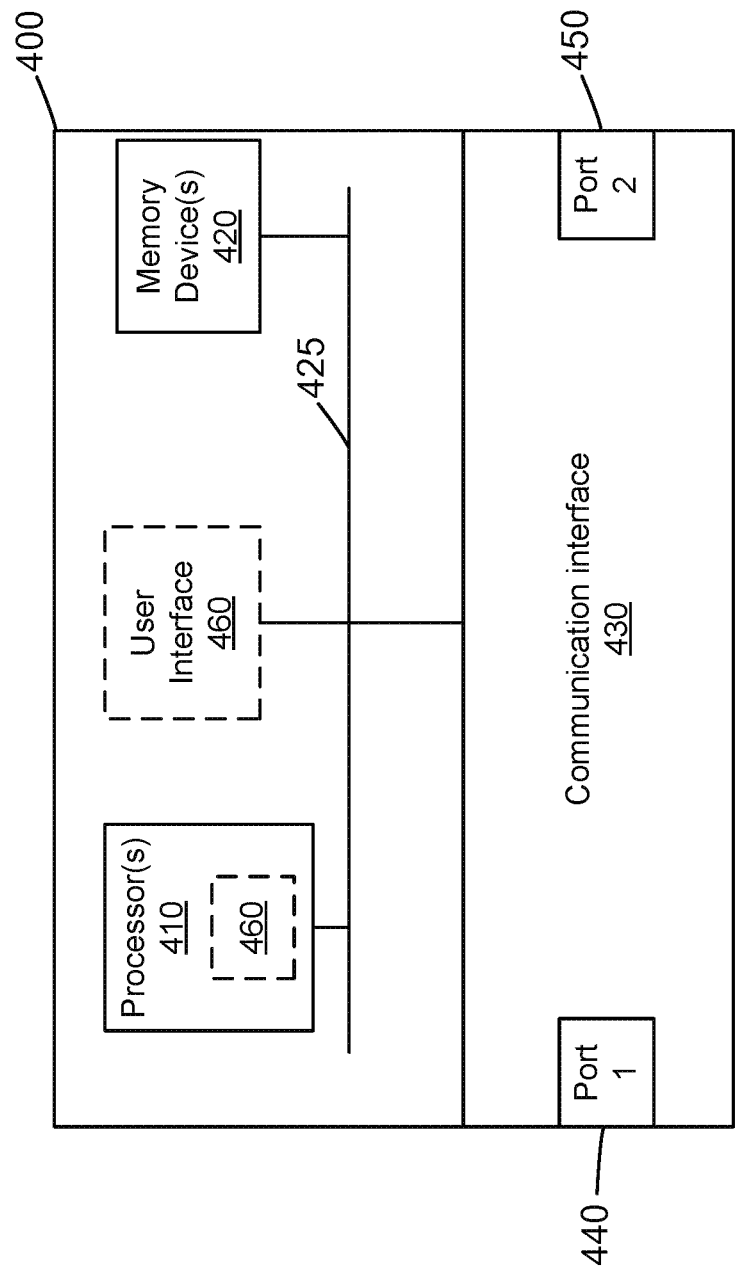
FIG. 4 shows a partial block diagram of an illustrative gateway device.

FIG. 4 shows a partial block diagram of an illustrative gateway device 400, such as the gateway device 330 of FIG. 3. The gateway device 400 may be variously configured to, for example, to include one or more processor(s) 410, communicatively coupled via a communications link (e.g., a data bus 425) to one or more memory devices 420, and a communication interface 430 that may include one or more communications ports such as at least a first communication port 440 and a second communication port 450. In some cases, the gateway device 400 may optionally include a user interface 460 which may be provided by the processor(s) 410 and/or coupled to the processor(s) 410 via the data bus 425, such as display ports, keyboard ports, and/or communication ports (Bluetooth, LAN, WiFi, remote ports, cell phone ports, table ports, etc.). The one or more memory devices 420 may, for example, be configured to store instructions that, when executed, cause the processor to at least perform the techniques disclosed herein such as those described as 600 et al., 700 et al. illustrated in FIGS. 6 and 7. The instructions may be stored in any type of computer-readable medium or memory to configure the operation of the processor 201. For example, the instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive. In many cases, the size and/or type of the one or more memory devices 420 incorporated into the gateway device 400 may be chosen based, at least in part, on a cost and/or a latency associated with a particular memory or memory type. Similarly, costs, latency times, and/or processing power may be factors used when specifying which particular processor to be used in the gateway device 400. For example, a processor having a slightly greater cost, may be chosen based on having a significantly smaller latency time than other possible processors, or vice versa. Similarly, a supplier and/or manufacture of the gateway device 400 may choose one or more memory devices 420 and/or a communication chipset based on similar criteria.

The communication interface 430 may include one or more of the communication ports 440, 450 to facilitate communication via one or more networks. For example, the first communication port 440 may be configured for communication via the one or more external networks 109, such as via coaxial cable, fiber optic cable, wireless cellular signal, satellite, or any other desired media for transmitting content signals. The second communication port 450 may be configured to communicate via one or more local interfaces, such as a wired or wireless connection to the client device. For example, the second communication port 450 may support any direct and/or network connection between the gateway device 330 and the client device 340.

The user interface 460 may be optionally included in the gateway device 400. For example, the gateway device 400 may include one or more visual indicators (e.g., a graphical user interface, a liquid crystal display, one or more light emitting diodes (LEDs), etc.) and/or audio indicators (e.g., a speaker), for example, to indicate a status of the gateway device 400. In some cases, the user interface 460 may include a manual interface for interaction with a user. For example, a user may optionally be allowed to enter a program change request using one or more buttons and/or switches provided at the exterior of the gateway device 400. In some cases, the user interface may include a wireless interface, such as an infrared and/or a radio frequency interface. In such cases, a user may interact with the gateway device 400 such as to enter a program change request via a remote control device. In some cases, however, a program change request may be entered by the user at the user device (e.g., a television, a computer, etc.) or at the client device either directly (e.g., manually), or remotely (e.g., a remote control device, a computer interface, an application on a mobile device, etc.).

Figure 5:
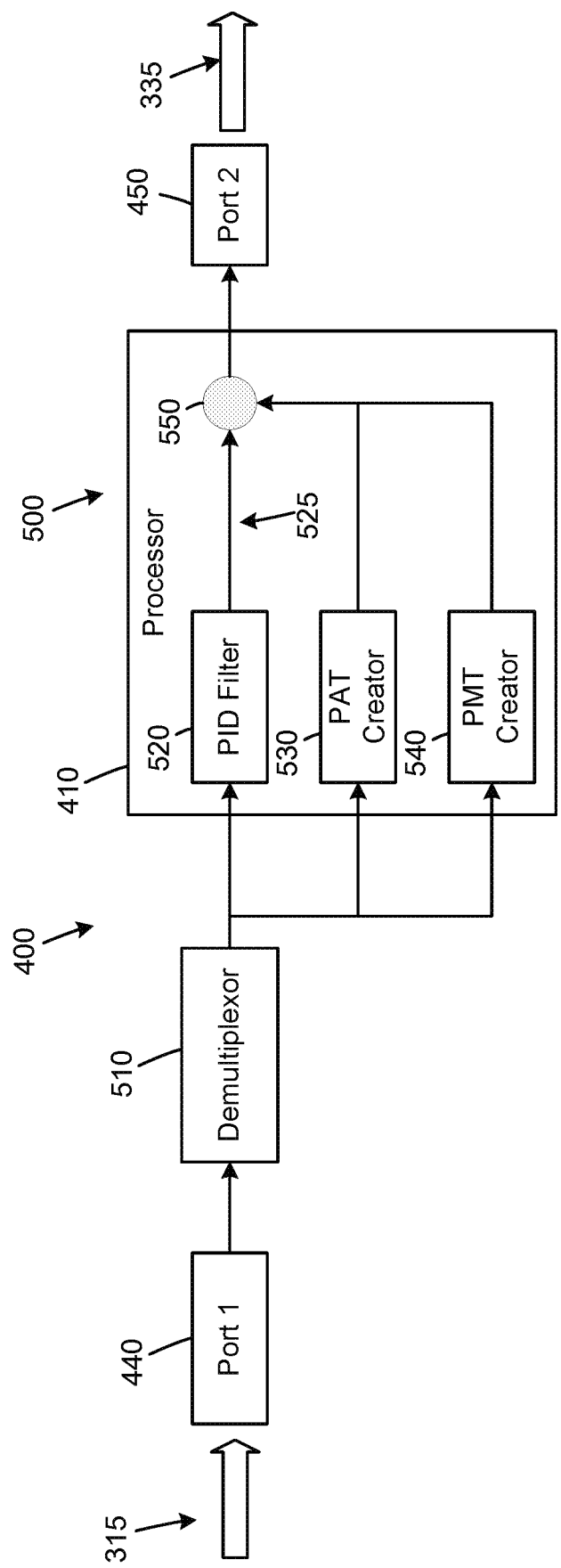
FIG. 5 shows an illustrative process and architecture for delivering content to a user device according to at least some embodiments.

FIG. 5 shows an illustrative process 500 for delivering programming content to a user device 350 according to at least some embodiments. For example, the gateway device 400 may receive a transmission (e.g., the MPTS 315) at the first communication port 440. The MPTS 315 may be received at a de-multiplexor 510 that may be included in the gateway device 400. In some cases, the de-multiplexor 510 may be included in the processor 410, as a separate integrated circuit, and/or as individual electronic components (e.g., transistors, capacitors, resistors, diodes, etc.). The de-multiplexor may be configured, in response to a program change request, to provide at least a portion of the MPTS 315 to the processor for further processing. For example, the processor may include a filter 520 (e.g., a program identifier (PID) filter) that may be used to produce a different transmission (e.g., a partial SPTS 525). The partial SPTS 525 may include one or more of the program association table, the program mapping table associated with the requested program and any elementary streams including programming audio and/or video content. In many cases, the filter 520 may be used to remove, or otherwise filter, portions of the MPTS 315 that are not associated with the program request. For example, the filter 520, the PAT creator 530, and/or the PMT creator 540 may be used to remove references (e.g., a PMT, an entry in the PAT, etc.) to any content included in the MPTS other than the requested program. In some cases, the filter 520 may be used to remove any elementary streams associated with programs other than the requested program. At 550, the processor may be configured to combine one or more of the new PAT and the new PMT with the partial SPTS 525 to produce a compliant transmission (e.g., a compliant SPTS 335) at the output of the second communication port 450. In some cases, the processor will be configured to supply one of the new PAT or the new PMT at a time. For example, during a first time period the partial SPS is combined with the new PAT for communication with the client device 340 for a specified time period. After that specified time period, the processor 410 may revert back to the original PAT and combine the new PMT with the partial SPTS 525 for communication to the client device 340.

In some cases, the processor 410 may include a PAT creator 530 and/or a PMT creator 540 that may be used to modify, or otherwise create, a new PAT and/or a new PMT associated with the requested program. For example, the PAT creator 530 and/or the PMT creator 540 may be used to create a PAT and a PMT that allows a produced SPTS 335 to be compliant with one or more specifications, such as an Advanced Television systems Committee (ASTC) specification, a Consumer Electronics Association (CEA) specification, a DLNA specification, a DTCP specification, an International Standards Organization (ISO) specification, an OpenCable (OC) specification, a Universal Plug-and-Play UPnP specification, and/or a Society of Cable Telecommunications Engineers (SCTE) specification. For example, the PAT creator 530 and the PMT creator 540 may be configured to include a DTCP descriptor into the PAT and the PMT, respectively to be compliant with a DLNA specification (e.g., DLNA volume 3).

Figure 6:
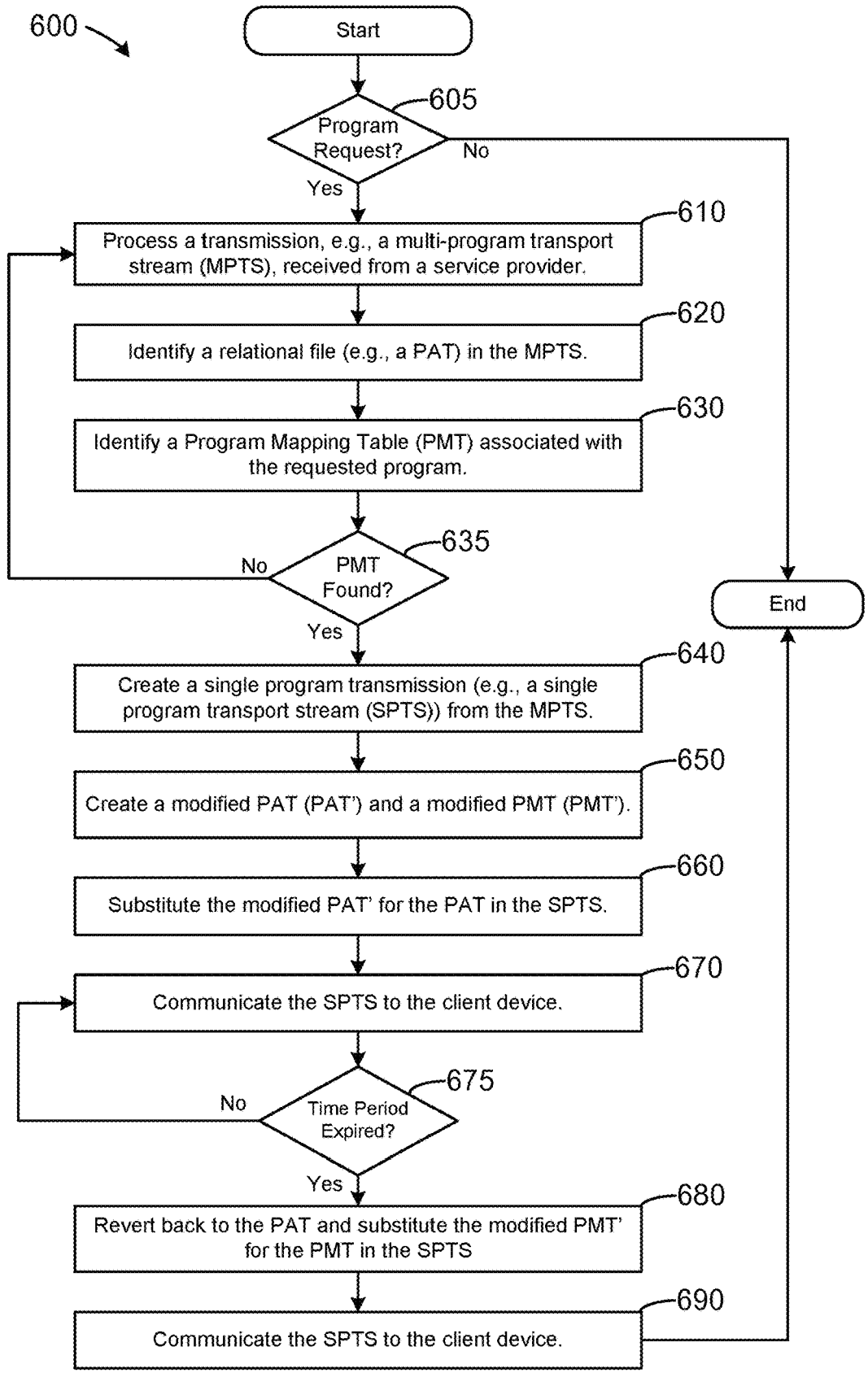
FIGS. 6 and 7 show illustrative processes of delivering desired content to a user device in response to a program change request according to at least some embodiments.
Figure 7:
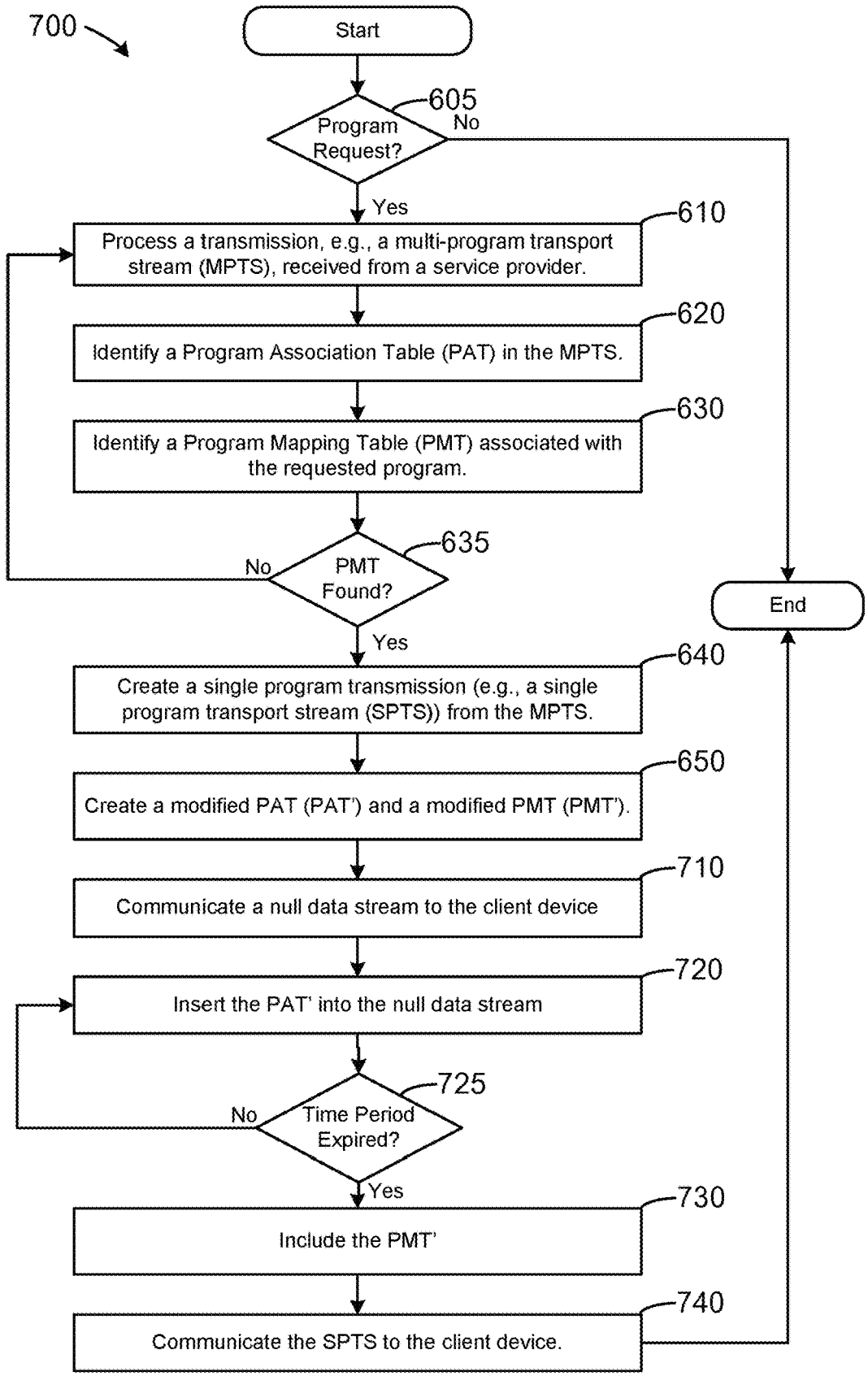

FIGS. 6 and 7 show illustrative processes 600, 700 of delivering a requested content item (e.g., a program) to a user device in response to a program change request according to at least some embodiments. Although some steps may be discussed as being performed by components or devices shown and numbered in these figures, this is done for illustrative purposes only and is in no way limiting. In some cases, the illustrative processes 600, 700 may be used for delivering a requested program to a user device after the device (e.g., the gateway device 400) joins a network, establishes a connection, or simply powers up. In some cases, the illustrative processes 600, 700 may be used for an automated process operating in the background when a user is viewing a program. For example, a background task may be used for tuning to a specified program in response to a request from a background task, such as a program request related to a digital video recorder (DVR) event. At 605, the gateway device 400 may check to see if a program change request, or other program request, has been issued. For example, the user 360 may request a program change via a remote and/or manually, via the gateway device 400, the client device 340 and/or the user device 350. If so, at 610 and in response to the program change request, the gateway device may process a transmission (e.g., a multi-program transport stream received from the service provider, such as the MPTS 315, and, in some cases, store at least a portion of the multi-program transport stream (e.g., a packet) into the one or more memory devices 420. If, at 605, a program change request has not been received, however, the process may end.

At 620, the gateway device 400 may identify a relational file, such as a program association table, within the MPTS 315 that includes at least one reference to the requested program. For example, the processor may locate the relational data within the MPTS 315 and store the data into the one or more memory devices 420. The processor may then parse the data to determine whether or not a link to the PMT associated with the requested program is listed within the data (e.g., a PAT). Once found, the processor may then identify the desired PMT using the information stored in the PAT and/or store the PMT into, e.g., the one or more memory devices 420, at 630. If the PMT was not found within that particular MTSP packet, at 635, the processor may then repeat the process after processing a new packet of the transmission (e.g., the MPTS) at 610.

At 640, if the PMT associated with the requested program was found, the processor 410 may then create at least a single program transmission (e.g., a partial SPTS) from information communicated in the MPTS. For example, the processor may filter, or otherwise remove, references to programs other than the desired program. In other cases, the processor may filter elementary streams (e.g., an audio stream, a video stream, etc.) associated with these different programs, such that the audio and video elementary streams associated with the desired program remain in the single program transmission, such as the partial SPTS.

At 650, the gateway or another computing device in the system may create a modified PAT (PAT') and/or a modified PMT (PMT') based on the information in the PAT. For example, the PAT creator 530 may be configured to create the modified PAT', such as by removing references to content different than the requested content. For example, the PAT creator 530 may remove links to PMTs and/or to elementary streams different than those corresponding to the requested program. In some cases, the PAT creator 530 may include one or more additional parameters. For example, the PAT creator 530 and/or the PMT creator 540 may be used to include at least one additional parameter (e.g., a DTCP descriptor) so that PAT' and/or PMT' may be compliant with at least one standard, such as a DLNA specification.

At 660, the processor 410 may combine the partial SPTS and PAT' by substituting the new PAT' for the original PAT in the partial SPTS to form a new compliant single program transmission (e.g., a compliant SPTS). At 670, the processor may then communicate the partial SPTS to the client device 340 for a specified time period so that the client device 340 may recognize the new PAT'. This time period may be determined as an average and/or an approximate time necessary for the client device to recognize the new PAT' in response to the program change request. In some cases, this time may be specified in one or more different standards.

At 675, the processor may determine whether or not the time period has elapsed. If not, the gateway device 400 continues to communicate the compliant SPTS with PAT' to the client device 340. If so, at 680, the processor 410 may revert back to sending the original PAT and substitute the new PMT' for the original PMT within the SPTS. At 690, the gateway device 330 may then communicate the compliant SPTS including the program requested by the user 360 to the client device 340.

In FIG. 7, the process 700 may be similar to the process 600 through step 650. For example, as mentioned above, the gateway device may be configured to communicate a specified data stream (e.g., null packets) when keeping a communication link (e.g., an HTTP socket) active between the gateway device 400 and the client device 340, such as at 710. At 720, the gateway device 400 may insert the new PAT' into the null stream for a specified amount of time. At 725, the gateway device may monitor time to determine whether or not the specified time period has elapsed. If not, the gateway device continues to insert PAT' into the null stream. If so, then at 730, the gateway device 400 may insert the new PMT' into the partial SPTS to form a compliant SPTS and then, at 740, communicate the SPTS to the client device 340.

Figure 8:
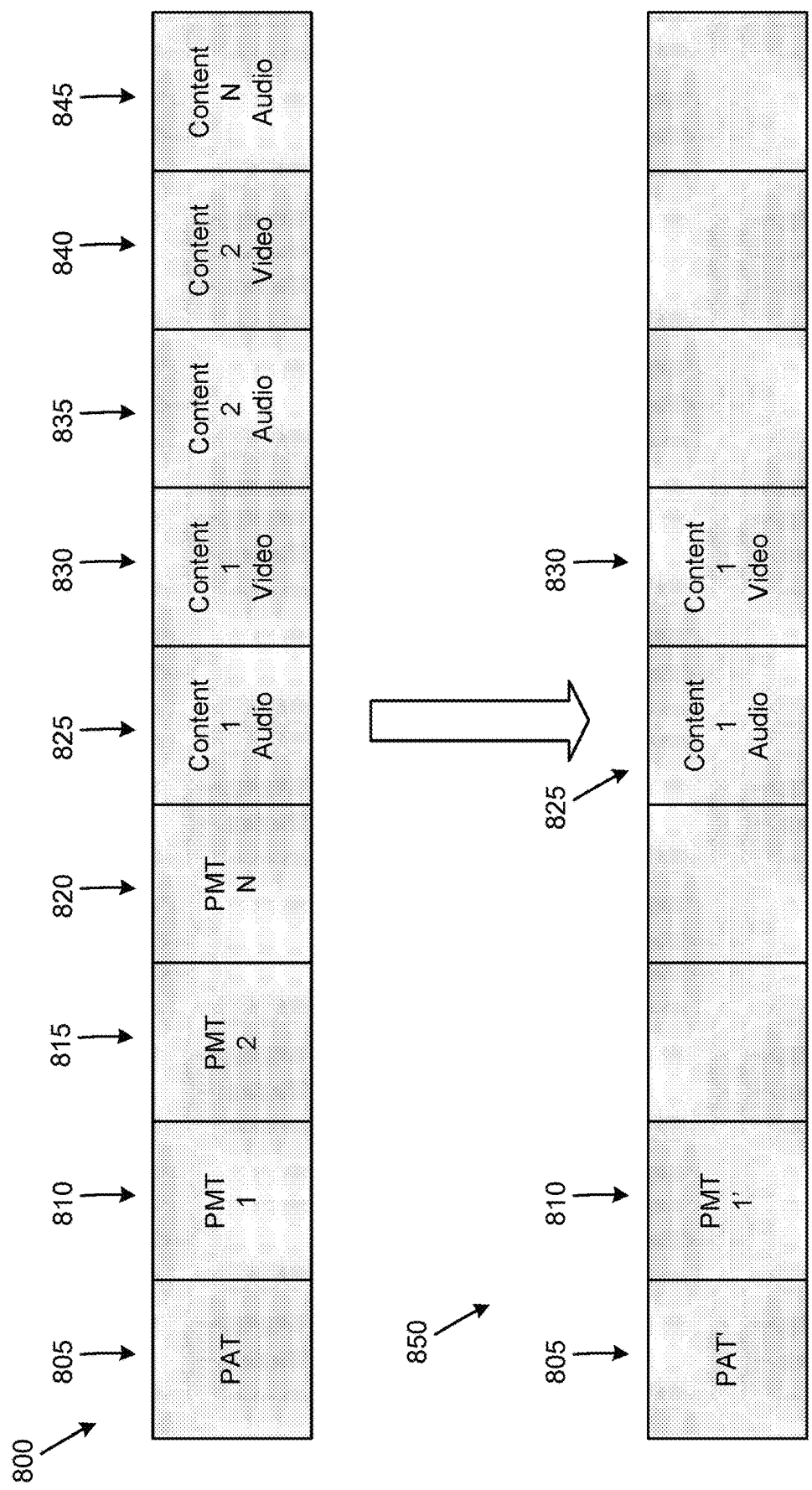
FIG. 8 shows an illustration of a multi-program transport stream and a single program data stream derived, at least in part, from the multi-program transport stream according to at least some embodiments.

FIG. 8 shows an illustrative multi-program transmission, such as the multi-program transport stream 800, and an illustrative single program transmission, such as the single program data stream 850, derived, at least in part, from the multi-program transport stream according to at least some embodiments. For example, the MPTS 800 may include a PAT at location 805, one or more PMTs at locations 810-820 each associated with a different program. The MPTS may also include one or more elementary streams at locations 825-845 within the data stream which may include content of the different programs. The gateway device 400 may be configured to form the partial SPTS and the compliant SPTS based, at least in part, on the MPTS. For example, locations within the data stream for the PAT or PAT', the PMT or PMT', and the elementary data streams (e.g., the audio and video content of the requested program), may remain the same between the MPTS and the SPTS. Thus, even if, for some reason, a transport stream was not properly communicated (e.g., an MPTS transferred, a different program included, etc.), the client device 340 may still be able to provide the requested programming to the user 360 via the user device 350.

Figure 9:
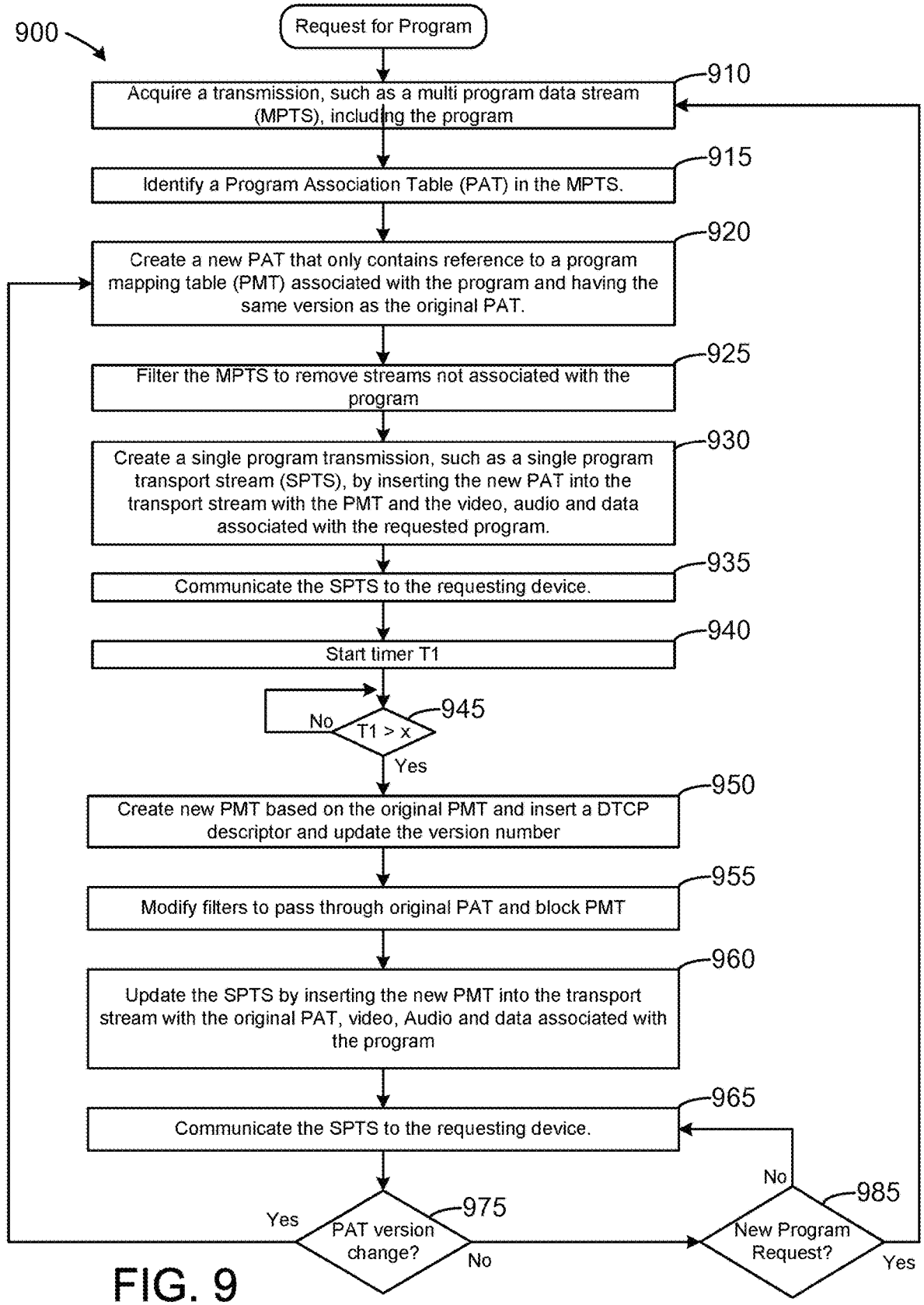
FIG. 9 shows an illustrative process of delivering desired content to a user device in response to a program change request according to at least some embodiments.

FIG. 9 shows another illustrative process 900 of delivering a requested program to a user device in response to a program change request according to at least some embodiments. Although some steps may be discussed as being performed by components or devices shown and numbered in these figures, this is done for illustrative purposes only and is in no way limiting. At 910, in response to a request for new programming content, the gateway device 400 may acquire a transmission, such as a multi-program transport stream, that may include the requested content, such as the MPTS 315, from the service provider and, in some cases, store at least a portion of the message into the one or more memory devices 420. At 915, the processor 410 of the gateway device 400 may identify, or otherwise acquire, a PAT within the MPTS 315 that includes at least one reference to the requested program. For example, the processor may locate the PAT within the MPTS 315 and store the PAT into the one or more memory devices 420. The processor 410 may then parse the table to determine whether or not a link to the PMT associated with the requested program is listed within the PMT. At 920, the processor 410 may be configured to create a new PAT that may contain a reference to a PMT associated to the requested program, without references to other programming content within the MPTS. The new PAT may be created having a same version number as the original PAT. In some cases, the new PAT may be created having a version number greater than the version number of the original PAT. In some cases, the version number associated with the new PAT may be greater than or equal to the version number associated with a PAT that was previously delivered to the requesting device, such as before receiving the program change request.

At 925, the processor 410 may be configured to filter the transmission (e.g., the MPTS) to remove one or more content streams (e.g., a video content stream, an audio content stream, a data content stream, etc.) not associated with the requested program. In some cases, the processor may filter the one or more content streams using a PID filter configured to filter content based on a particular program identifier (e.g., a PID associated with the requested program). At 930, the processor 410 may create a single program transmission (e.g., an SPTS) that contains one or more content streams associated with the new program by inserting the new PAT into the transport stream with the PMT and the video, audio and data associated with the requested program. For example, the processor 410 may be configured to use the filtered MPTS when substituting the new PAT for the original PAT within the SPTS. At 935, the processor 410 may communicate the SPTS to the requesting device. At 940, the processor 410 may start a timer (e.g., the timer T1). The processor 410 may be configured to use the timer when communicating the SPTS with the new PAT for a specified time period. The SPTS with the new PAT may be communicated over the specified time period to allow the receiving device to recognize a change from the original PAT to the new PAT. IN some cases, the specified time period may correspond to a transport time of a PAT (e.g., about 30 milliseconds about 50 milliseconds, about 75 milliseconds, about 100 milliseconds, etc.) or multiples of the average transport time (e.g., about 100 milliseconds, about 200 milliseconds, about 500 milliseconds, etc.). In some cases, the timer may be included with the processor or may be a separate component.

At 945, the processor 410 may monitor the time to see if the specified time period has elapsed. If not, the processor 410 continues communication of the SPTS to the requesting device. If so, at 950, the processor may create a new PMT based on the original PMT and insert a DTCP descriptor, or other new information by way of other descriptor types, into the new PMT to ensure compliance with at least one communications standard. In some cases, the processor 410 may assign a version number associated with the new PMT that is greater than the version number associated with the original PMT and/or a version number associated with a PMT that was delivered to the requesting device before receiving the program change request.

At 955, the processor 410 may be configured to modify the single program transmission (e.g., the SPTS) to be communicated to the requesting device by reverting back to the original PAT and substituting the new PMT for the original PMT. For example, the processor may modify a filter to pass through the original PAT and to block the original PMT. At 960, the processor 410 may then update the SPTS by inserting the new PMT into the SPTS at the same location the original PMT occupied in the SPTS, so that the SPTS now includes the original PAT, the new PMT and the content streams (e.g., Audio, Video, Data, etc.) associated with the requested program. At 965, the processor 410 may communicate the SPTS to the requesting device.

At 975, the processor 410 may monitor at least one of the multi-program transmission (e.g., the MPTS) and the single program transmission (e.g., the SPTS) to determine whether the version number of the PAT has changed. If so, the processor 410 may create a new PAT associated with the new version number at 920. If not, at 985 the processor 410 may determine whether a new program request has been received at the gateway device 400, such as by monitoring a communication link. If no request has been received, the processor 410 continues to communicate the SPTS to the requesting device at 965. If a new programming request has been received, then the processor 410 may then acquire an MPTS that contains the newly requested program at 910.

The various features described above are merely non-limiting examples, and can be rearranged, combined, subdivided, omitted, and/or altered in any desired manner. For example, features of the servers can be subdivided among multiple processors and computing devices. The described example computing devices, servers and functions can be implemented individually on different devices, or they may be combined into a single device.

In at least some embodiments, each of the servers and computing devices described above may be implemented as multiple servers or devices for redundancy and/or to increase the amount of analysis, data storage and other services being performed, in some cases simultaneously. For example, the content server 106 and/or the service provider server 310 may include one or more hardware interfaces that provide physical connections by which the server communicates with other servers in the content delivery system and/or with other elements of the network. In at least some embodiments, the servers may include hardware interfaces that may include one or more Ethernet cards. The servers may further include a memory for storing instructions and data and a processor for executing instructions and controlling operation of the server. Memory and/or computational operations of the servers may be respectively distributed across multiple memory devices and/or multiple processors located within the server and/or across memory and processors located on multiple platforms. In some cases, the memory may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. The processor may be implemented with any of numerous types of devices, including but not limited to one or more general purpose microprocessors, one or more application specific integrated circuits, one or more field programmable gate arrays, and combinations thereof. In at least some embodiments, the processor may process operations described herein according to machine readable instructions stored in the memory and/or stored as hardwired logic gates within the processor. In some cases, the processor may communicate with and/or control the memory and interface devices over one or more buses.

Other variations to the embodiments described may also be made, and the true scope of this patent should only be defined by the claims that follow.

The invention claimed is:

1. A method comprising:
receiving, by a computing device and from a client device, a request for a program;
receiving, by the computing device, multi-program data comprising the requested program and a first association table indicating locations within the multi-program data at which assets for a plurality of programs are located;
generating, based on the multi-program data, single-program data comprising assets for the requested program and a second association table comprising information indicative of assets associated with the requested program;
generating a digital rights management attribute for the requested program;
transmitting, by the computing device and to the client device, data comprising the requested program and the digital rights management attribute, wherein the data comprises the single-program data, and the transmitting of the data comprises modifying the second association table to comprise the digital rights management attribute;
determining a period of time for the client device to recognize the data; and
in response to determining that the period of time has elapsed, modifying the data by replacing the modified second association table within the single-program data with the first association table and transmitting the modified data to the client device.

2. The method of claim 1, wherein:
the digital rights management attribute comprises a digital transmission content protection (DTCP) attribute.

3. The method of claim 1, further comprising:
inserting the second association table into a null stream.

4. The method of claim 1, wherein:
generating the single-program data further comprises:
identifying, from the multi-program data, program mapping data associated with the requested program; and
the single-program data is generated based on the identified program mapping data, the second association table, and assets for the requested program.

5. The method of claim 1, wherein the request for the program comprises a content change request.

6. The method of claim 4, wherein:
modifying the second association table to comprise the digital rights management attribute comprises:
modifying the program mapping data to comprise the digital rights management attribute.

7. A method comprising:
transmitting, by a client device and to a computing device, a request for a program, wherein the computing device is configured to receive multi-program data comprising the requested program and a first association table indicating locations within the multi-program data at which assets for a plurality of programs are located, and the computing device is configured to generate, based on the multi-program data, single-program data comprising assets for the requested program and a second association table comprising information indicative of assets associated with the requested program;
receiving data comprising the requested program and a digital rights management attribute, wherein the digital rights management attribute is generated by the computing device for the requested program, and wherein the data comprises the single-program data, and the computing device is configured to transmit the data and modify the second association table to comprise the digital rights management attribute;
recognizing, by the client device, the received data within a period of time;
receiving, by the client device and from the computing device, the single-program data with the modified second association table replaced with the first association table; and
generating for display the requested program.

8. The method of claim 7, wherein the digital rights management attribute comprises a digital transmission content protection (DTCP) attribute.

9. The method of claim 7, wherein the request for the program comprises a content change request.

10. The method of claim 7, wherein the second association table is received by the client device as part of a null stream.

11. The method of claim 7, wherein:
program mapping data associated with the requested program is identified in the multi-program data; and
the single-program data is generated based on the identified program mapping data, the second association table, and assets for the requested program.

12. The method of claim 7, further comprising recognizing, by the client device, the received data within a period of time.

13. The method of claim 11, wherein:
the program mapping data comprises the digital rights management attribute.

14. A system comprising:
control circuitry configured to:
transmit, by a client device and to a computing device, a request for a program, wherein the computing device is configured to receive multi-program data comprising the requested program and a first association table indicating locations within the multi-program data at which assets for a plurality of programs are located, and the computing device is configured to generate, based on the multi-program data, single-program data comprising assets for the requested program and a second association table comprising information indicative of assets associated with the requested program;
receive data comprising the requested program and a digital rights management attribute, wherein the digital rights management attribute is generated by the computing device for the requested program, and wherein the data comprises the single-program data, and the computing device is configured to transmit the data and modify the second association table to comprise the digital rights management attribute;
recognize the received data within a period of time; and
receive, by the client device and from the computing device, the single-program data with the modified second association table replaced with the first association table; and
display circuitry configured to:
generate for display the requested program.

15. The system of claim 14, wherein the digital rights management attribute comprises a digital transmission content protection (DTCP) attribute.

16. The system of claim 14, wherein the request for the program comprises a content change request.

17. The system of claim 14, wherein the control circuitry is further configured to:
receive, by the client device and as part of a null stream, the second association table.

18. The system of claim 14, wherein:
program mapping data associated with the requested program is identified by the computing device in the multi-program data; and
the single-program data is generated by the computing device based on the identified program mapping data, the second association table, and assets for the requested program.

19. The system of claim 14, wherein the control circuitry is further configured to recognize the received data within a period of time.

20. The system of claim 18, wherein the program mapping data comprises the digital rights management attribute.

* * * * *